(No Model.)
W. OLIPHANT.
FILTER.
No. 417,833. Patented Dec. 24, 1889.
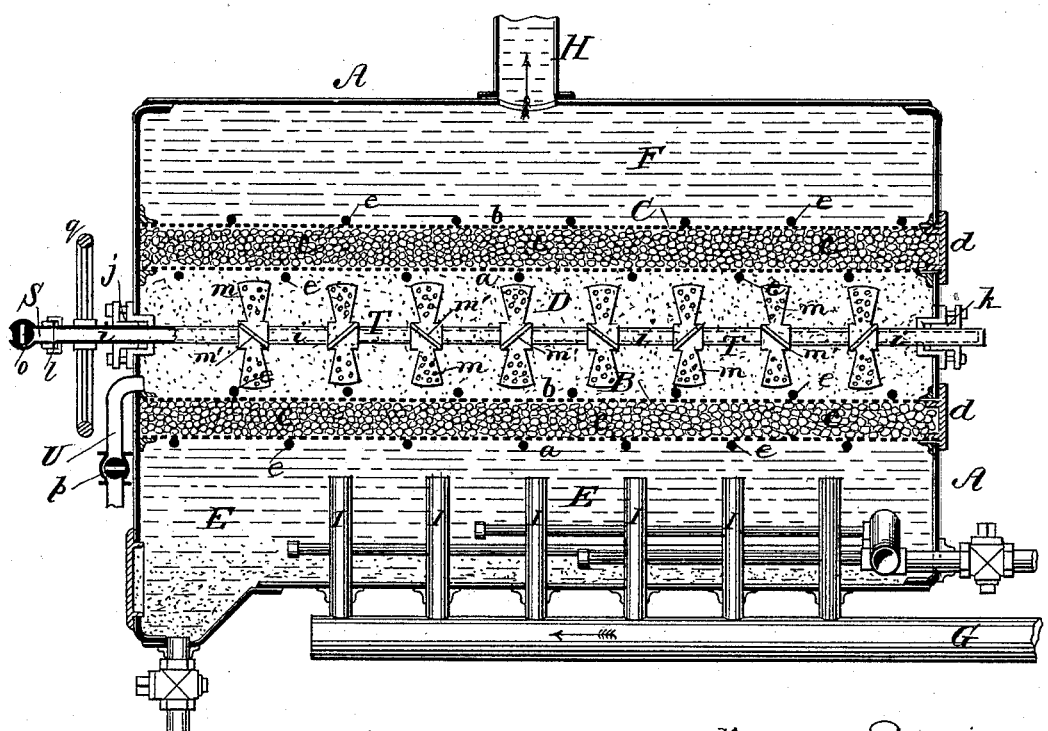
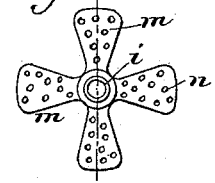
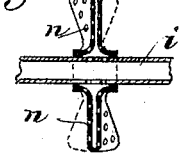
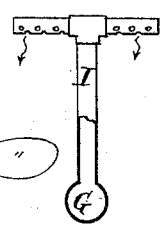
WITNESSES.
INVENTOR.
William Oliphant
ATTORNEY.

UNITED STATES PATENT OFFICE.

WILLIAM OLIPHANT, OF JERSEY CITY, NEW JERSEY.

FILTER.

SPECIFICATION forming part of Letters Patent No. 417,833, dated December 24, 1889.

Application filed December 11, 1888. Serial No. 293,271. (No model.)

*To all whom it may concern:*

Be it known that I, WILLIAM OLIPHANT, a citizen of the United States, residing at Jersey City, in the county of Hudson and State of New Jersey, have invented certain new and useful Improvements in Filters, of which the following is a specification.

My invention relates to purification of water or other liquid by mechanical filtration under pressure or free from pressure.

I have described in a patent of June 12, 1888, No. 384,539, a method by which a portion of the impurities are preparatorily separated by passage of the liquid through a filtering-bed of one grade of material to separate the impurities in part, and subsequently passed through a bed of a finer grade of material to take up the remainder of the impurities. The purpose of my present invention is to accomplish a similar purpose by separating the first portion of the impurities by their gravitation in a settling-chamber, through which the liquid is passed gradually, in lieu of separating such heavier or more tangible portions by a preparatory passage through a coarse filter-bed.

My invention consists in certain novel features of construction of a filtering apparatus by which I accomplish the aforesaid result.

Referring to the accompanying drawings, Figure 1 illustrates a sectional elevation of an apparatus embodying my invention; Fig. 2, a plan view of the cleansing-pipes therein; Figs. 3 and 4, detail views of modifications, and Figs. 5 and 6 details of cleansing devices employed in the filter-bed.

A is a cylindrical shell placed horizontally, and B and C suspending and retaining diaphragms, respectively, which hold the filtering-bed D in place, the said diaphragms and filter-bed traversing the shell A from side to side. I prefer to construct the diaphragms B and C as described in my patent application, Serial No. 275,995, filed June 4, 1888, the said construction consisting of double perforated plates or wire-netting *a b*, composing each diaphragm, supported by cross-rods *e* and between which plates or wire-netting are interposed a gravel or other suitable filling *c*.

*d* are covers to which the perforated plates or wire-netting are attached, and by the removal of which the diaphragms may be slid out for cleansing or renewing the filling or for other like purposes.

G and H are the inlet and outlet pipes, respectively, of the apparatus, and E and F are chambers or water-spaces above and beneath the filter-bed. The space E composes the settling-chamber, through which the up-current passes from the inlet G before reaching the filter-bed, and there are branch pipes I, that extend from the pipe G into the chamber E, so as to deliver the current of liquid at a level above the main portion of the chamber E. The body of liquid surrounding the branch pipes I forms a repository or settling-space comparatively free from the motion of circulation, and the liquid issuing from the pipes I strikes the bottom of the diaphragm, but does not pass directly through it, being thrown back in downward currents through the liquid-space beneath, in which the liquid remains comparatively at rest until gradually absorbed through the filter-bed according to the rate of eduction at H.

The openings of the pipes I from which the liquid issues may, if desired, be provided with terminations such as are suitable to throw the liquid downward toward the bottom of the chamber E to avoid direct circulation of any portion of the liquid through the filter-bed before passing through said chamber. Such terminals for the pipes as I have illustrated in Figs. 3 or 4 may be employed, the first illustration whereof consists of a short transverse T head or pipe connecting to each pipe I, and having perforations upon its lower side from which the current issues, the second illustration consisting of a deflecting plate or hood *f*, that throws down the current, as indicated, upon its issue from the open end of the pipe I.

As the heavier particles of sediment gravitate from the liquid which is at rest in the chamber E, it becomes necessary from time to time to remove the accumulation; and in order that this may be accomplished without discharging the liquid from or materially interrupting the operation of the apparatus I have provided the washing-out pipes K, that are projected from the manifold M, connected to a source of liquid pressure through the cock N. The pipes K are open at their ends, or may be perforated, as at *h*, or both, and, having various lengths, are adapted to reach and cleanse different parts of the settling-chamber. A pocket P is provided at the bottom of the settling-chamber at the end of the filter opposite the pipes K, and to this a blow-off cock R is connected, so as to afford means of escape for the sediment which is precipitated into the pocket when the pipes K are applied without fouling the filter-bed.

The filter-bed D is cleansed from time to time, as it becomes fouled, by the injection of cleansing-currents through the pipe S, which currents are distributed throughout the various parts of the bed of filtering material by the combined injector and agitator T. The water thus introduced, together with such portions of fouled material as may be most readily taken up by it, find eduction through the pipe U or such other similar outer pipes as may be connected at different points with the filter-bed between the diaphragms.

The agitator T is rotative on a tubular shaft $i$, that extends centrally through the filter-bed and has journals in the packing-glands $j$ and $k$, so as to render the joints tight and separate the bearing-surfaces from access of sand and grit from the filter-bed, and the shaft $i$ is connected by a rotative union $l$ with the supply-pipe S. To the hollow shaft $i$ are fixed at suitable intervals the radial hollow blades $m$, that have perforations $n$ at various parts of their surfaces and are interiorly connected with the passage through the hollow shaft, as illustrated in Figs. 5 and 6. The blades $m$ of the agitator are oblique in cross-section to the axis of the shaft, as in a screw propeller, so that by rotation a combined motion is imparted to the material of the filter-bed both rotatively and longitudinally with relation to the shaft $i$. Moreover the alternate sets of blades $m$ are oppositely inclined, as indicated at $m'$ $m'$, so that the material is thrust both ways longitudinally to the shaft, producing thereby a variety of motions in the material and agitating the same as generally as possible. The outlet-pipes U may be placed near the top of the filter-bed, if desired, so that the finer particles of sediment with which the coarser particles of filtering material are fouled may the more readily be drawn off without sacrificing any unnecessary quantity of the filtering material. The cocks $o$ $p$ are both opened when it is desired to operate the rotary cleansing device, and the shaft $i$ is turned by the hand-wheel $q$ or by a suitable belt-pulley or other attachment.

I claim as my invention—

The combination, in a filtering apparatus, of a settling-space beneath a suspended filter-bed, inlet-pipes for the filtrate that deliver the liquid into said space at a level above the main portion thereof, washing-out pipes projected horizontally into the said settling-space and communicating therewith at various lower portions, and a discharge chamber or pocket and a discharge-cock located at a point in the bottom of the settling-chamber, toward which the cleansing-currents are delivered from the said washing-out pipes.

WILLIAM OLIPHANT.

Witnesses:
HENRY F. PARKER,
C. W. FORBES.